United States Patent [19]

Harris

[11] Patent Number: 4,831,762
[45] Date of Patent: May 23, 1989

[54] FISHING FLOAT

[76] Inventor: Olin P. Harris, P.O. Box 629, LaFayette, Ala. 36862

[21] Appl. No.: 176,210

[22] Filed: Mar. 31, 1988

[51] Int. Cl.$^4$ .................................................. A01K 93/06
[52] U.S. Cl. .................................................................. 43/17
[58] Field of Search ................................... 43/17, 43.11

[56] References Cited

U.S. PATENT DOCUMENTS

| | | | |
|---|---|---|---|
| 1,175,968 | 3/1916 | Meiners | 43/17 |
| 2,587,190 | 2/1952 | Merriweather | 43/17 |
| 2,779,122 | 1/1957 | DeGroff | 43/17 |
| 2,977,608 | 4/1961 | Brown et al. | 43/43.11 |
| 3,134,188 | 5/1964 | Petersen | 43/17 |
| 4,601,126 | 7/1986 | Klocksiem | 43/43.11 |

*Primary Examiner*—M. Jordan
*Attorney, Agent, or Firm*—Michael C. Smith

[57] ABSTRACT

A fishing float for catching fish during absence of the fisherman and indicating a caught fish comprising a buoyant body having a flat top surface and a flat bottom surface parallel thereto; a concentric central aperture through the float from top to bottom; a first flat side surface on the periphery of the float; and a second flat side surface on the periphery of the float; located opposite to and parallel to the first side surface.

7 Claims, 1 Drawing Sheet

FISHING FLOAT

TECHNICAL FIELD

The present invention relates generally to bait fishing, and specifically to a fishing float adapted to indicate when a fish is caught, and more specifically to a fishing float comprising a buoyant styrofoam member having a circular central aperture and an outer surface having substantial non-circular portions. This type of fishing is commonly referred to as jug fishing.

BACKGROUND ART

Fishing floats and bite detectors are well known in the art. Examples are shown in U.S. Pat. Nos. 2,779,122; 2,947,105; 885,627; 2,500,078; 2,772,504; 1,296,452; 3,578,748 and 2,901,855 and in British Pat. No. 2,093,671. The most common device is a hook, line and sinker secured to a plastic jug such as a milk jug.

While the varieties of fishing floats and bite indication devices are apparently well suited for their particular uses, until the present invention there has been no economical fishing float for use in catching fish and indicating a caught fish while allowing for ease of recovery of the float, easy storage of the float, quick variation of the fishing depth, easy accumulation of fishing line and avoidance of line tangles. It is for this reason that the present fishing float was invented.

DISCLOSURE OF INVENTION

The present invention promotes easy, convenient float fishing. The present invention is a fishing float having a styrofoam or similarly buoyant body, with a lenght and width of about ten inches, a depth of about two inches, a generally squared outer configuration, and a circualr, concentric aperture of about six inches in diameter extending through the depth of the body. A fishing line is securred to the float, and the float lies flat on the water until a fish is caught, which causes the float to stand on edge. Thus, a primary object of the present invention is to catch fish and indicate when a fish is caught.

Another major object of this invention is to provide such a fishing float which is easily visible, easy to retrive, is stackable, has quickly variable fishing line depth, and promotes easy accumulation of fishing while avoiding tangles of the line.

BRIEF DESCRIPTION OF THE DRAWINGS

While the specification concludes with claims particularly pointing out and distinctly claiming the subject matter which is regarded as the invention, it is believed that the invention, objects, features, and advantages thereof will be better understood from the following description taken in connection with the accompanied drawings in which like parts are given like identification numerals and wherein:

BEST MODE FOR CARRYING OUT THE INVENTION

While there are many ways of fishing, the general method used in connection with the present invention is often called jug fishing. Jug fishing is the technique of placing a baited hook, line and sinker on a free floating jug and leaving the jug to catch a fish. One fisherman usually jug fishes with a dozen or so jugs, lines, hooks and sinkers to multiply the opportunity to catch fish. Since the fisherman is not required to constantly monitor a fishing rod, this method is referred to as a passing fishing method. The fisherman simply monitors all floating jugs for obvious catches, and occasionally checks the bait. Major problems with jug fishing are inability to closely monitor fish bites, and tangled fishing lines.

Figure 1:
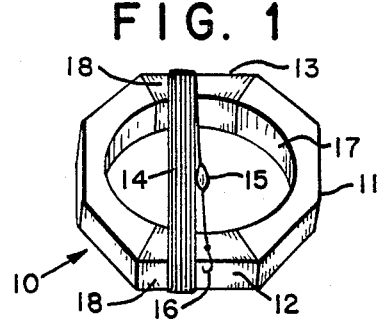
FIG. 1 is a top perspective of the present invention.

As FIG. 1 of the drawings illustrates, the preferred embodiment of the present fishing float 10 comprises a buoyant body 11 of styrofoam or similar material, a first flat outer surface 12, a second flat outer surface 13 parallel to the first outer surface 12 and located on the opposite side of body 11 from first outer surface 12, a fishing line 14, a sinker 15, a fishing hook 16, and a central aperture 17.

Body 11 has a highly visible outer finish, preferably white. Since the float 10 may also be used at night, the float 10 should also have surface portions which are covered with a reflective, iridescent or fluorescent material. As illustrated in FIG. 1, the float has reflective tape 18 covering the first outer surface 12 and the second outer surface 13. In addition to providing for increased visibility, tape 18 provides a protecting layer for surfaces 12 and 13 to prevent damage to body 11 by fishing line 14. Surfaces 12 and 13 are parallel to each other in order to provide opposing surfaces upon which fishing line 14 can be wound for storage. Central aperture 17 is concentric with body 11 and has a diameter equal to or greater than half of the distance between first surface 12 and second surface 13.

Body 11 is preferably ten inches in length from first surface 12 to second surface 13 and ten inches in width from side to opposite side. Aperture 17 has a preferred diameter of six inches. The large aperture 17 makes the float 10 easily retrievable from the water by a hook, pole, or similar device (not shown).

Figure 2:
FIG. 2 is a side view of the present invention.

Referring to FIG. 2, it can be seen that body 11 has a thickness approximately equal to twenty percent of the above described length. The preferred thickness is two inches. The two inch thickness assures a substantial float volume to assure buoyancy while promoting a low profile while the float 10 is lying in the water.

Referring again to FIG. 1, the fishing line 14 is generally up to about thirty feet in length and is secured to a portion of body 11 between the aperture 17 and the periphery of the body 11. Means for varying the fishing depth are provided by unwinding the line 14 to a desired length and then simply passing the hook 16, sinker 15 and line 14 attached thereto through the aperture 17 to prevent further unwinding. The flat surfaces 12 and 13 provide a line storage surface which discourages slipping of the line 14 and avoids line 14 tangles.

The relatively shallow depth of the body 11, and the fact that the top surface 21 and the bottom surface 22 are parallel to each other and perpendicular to the sides 23 make the fishing float 10 stackable with similar fishing floats 10.

Figure 3:
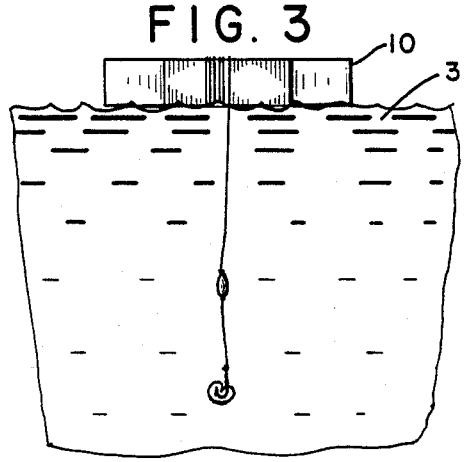
FIG. 3 is a side view of the present invention in operation in horizontal alignment.
Figure 4:
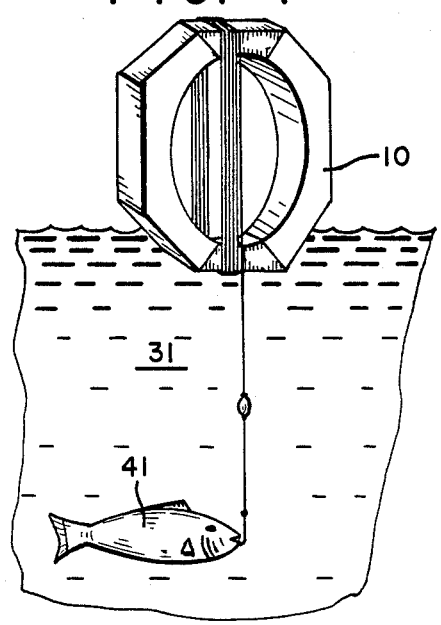
FIG. 4 is a side view of the present invention in operation in vertical alignment.

Since the central aperture 17 has a diameter at least one half the length of the body 11, the aperture 17 is large enough to promote eacsh capture of the float 10 by a retrieval rod or similar tool (not shown) which can be inserted into the aperture 17. The float 10 lies flat, substantially horizontal in the water 31, as shown in FIG. 3. Since the central aperture 17 is relatively large, a caught fish 41 easily exerts sufficient force to stand the float 10 up, vertically in the water 31, alerting the fisherman of the catch.

While the configuration of the body 11 can be that of a circular aperture 17 and an octagonal periphery as shown in FIG. 1, other embodiments which also comprise the critical elements fo the fish float 10 are found in the remaining Figures.

Figure 5:
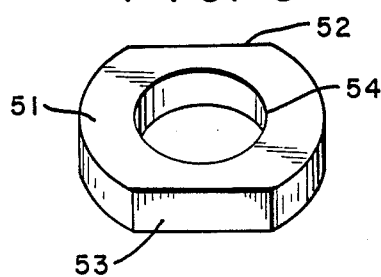
FIG. 5 is a top view of a second embodiment of the present invention.
Figure 6:
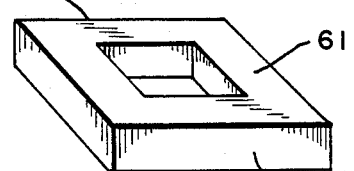
FIG. 6 is a top view of a third embodiment of the present invention.
Figure 7:
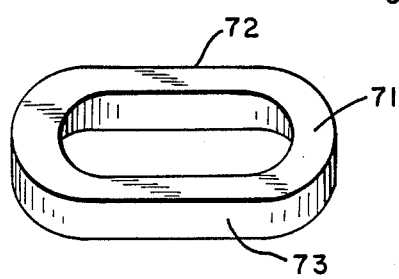
FIG. 7 is a top view of the fourth embodiment of the present invention.

FIG. 5 shows a generally donut shaped body 51 with a first flat edge 52 and a second flat edge 53. The aperture 54 may be circular or may be of another substantially uniform configuration, such as an octagon or a square. FIG. 6 shows another embodiment 61 with a square periphery and first and second flat surfaces 62 and 63. FIG. 7 shows a generally oval shaped body 71 which also has the required first and second flat surfaces 72 and 73.

This invention is a fishing float 10 for catching fish 41 during the absence of a fisherman and indicating a caught fish 41. It comprises a buoyant body 11 having a flat top surface 21 and a flat bottom surface 22 parallel to the flat top surface 21, uniform sides 12, 13, 23 having surfaces generally perpendicular to said top 21 and bottom 22 surfaces and extending between said top 21 and bottom 22 surfaces; a concentric central aperture 17 extending through the depth of said body 11 from the top surface 21 to the bottom surface 22; a first flat side surface 12 on the periphery of said body 11; and a second flat side surface 13 on the periphery of said body 11, located opposite to said first side surface 12 and parallel thereto. The body 11 comprises a high visibility outer surface. The first flat side surface 12 and the second flat side surface 13 are covered with a protective covering 18. The float 10 further comprises a fishing line 14, a fishin hook 16 and a weight 15. The distance from the top surface 12 to the bottom surface 13 is twenty percent of the average distance of the length and width of the float 11 from side 23 to opposite side 23. The preferred distance from the top surface 12 to the bottom surface 12 is two inches. The preferred length of the float 11 is ten inches. The preferred width of the float 11 is ten inches. The central aperture 17 has a width equal to or greater than one half of the average width of the float from side 23 to opposite side 23. The aperture 17 has a preferred width of six inches or a preferred diameter of six inches. The outer periphery of said float 11 is preferably of a generally octagonal configuration. The outer periphery of said float 11 may have a generally square configuration. The outer periphery of said float 11 may have a generally oval configuration with parallel first 12 and second 13 flat surfaces. The outer periphery of said float 11 may have a generally circular configuration with parallel first 12 and second 13 flat surfaces.

While this invention has been described in detail with particular reference to a preferred embodiment thereof, it will be understood that variations and modifications can be effective within the spirit and scope of the invention as described hereinbefore and as defined in the appended claims.

INDUSTRIAL APPLICABILITY

This invention is capable of exploitation in the sport fishing equipment industry and is particularly useful in the passing fishing technique of free floating bait fishing.

I claim:

1. A fishing float for catching fish during the absence of a fisherman and indicating a caught fish comprising:
    a buoyant body having a highly visible outer surface, a flat top surface and a flat bottom surface parallel to the flat top surface, uniform sides having surfaces generally perpendicular to said top and bottom surfaces and extending between said top and bottom surfaces;
    a concentric central aperture extending through the depth of said body from the top surface to the bottom surface;
    a first flat side surface on the periphery of said body, having a protective covering;
    a second flat side surface on the periphery of said body, having a protective covering and located opposite to said first side surface and parallel thereto; and
    a fishing line, a fishing hook, and a weight;
    further provided that the distance from the top surface to the bottom surface is twenty percent of the average distance of the length and width of the float from side to opposite side; the distance from top to bottom is about two inches; the length of said float is about ten inches; the width of said float is about ten inches; and the central aperture has a width equal to or greater than one half of the average width of the float from side to opposite side.

2. The apparatus of claim 1 wherein the aperture has a width of six inches.

3. The apparatus of claim 2 wherein the aperture has a diameter of six inches.

4. THe apparatus of claim 1 wherein the outer periphery of said float is of a generally octagonal configuration.

5. The apparatus of claim 1 wherein the outer periphery of said float has a generally square configuration.

6. The appartus of claim 1 wherein the outer periphery of said float has a generally oval configuration with parallel first and second flat surfaces.

7. The apparatus of claim 1 wherein the outer periphery of said float has a generally circular configuration with parallel first and second flat surfaces.

* * * * *